Patented Apr. 4, 1944

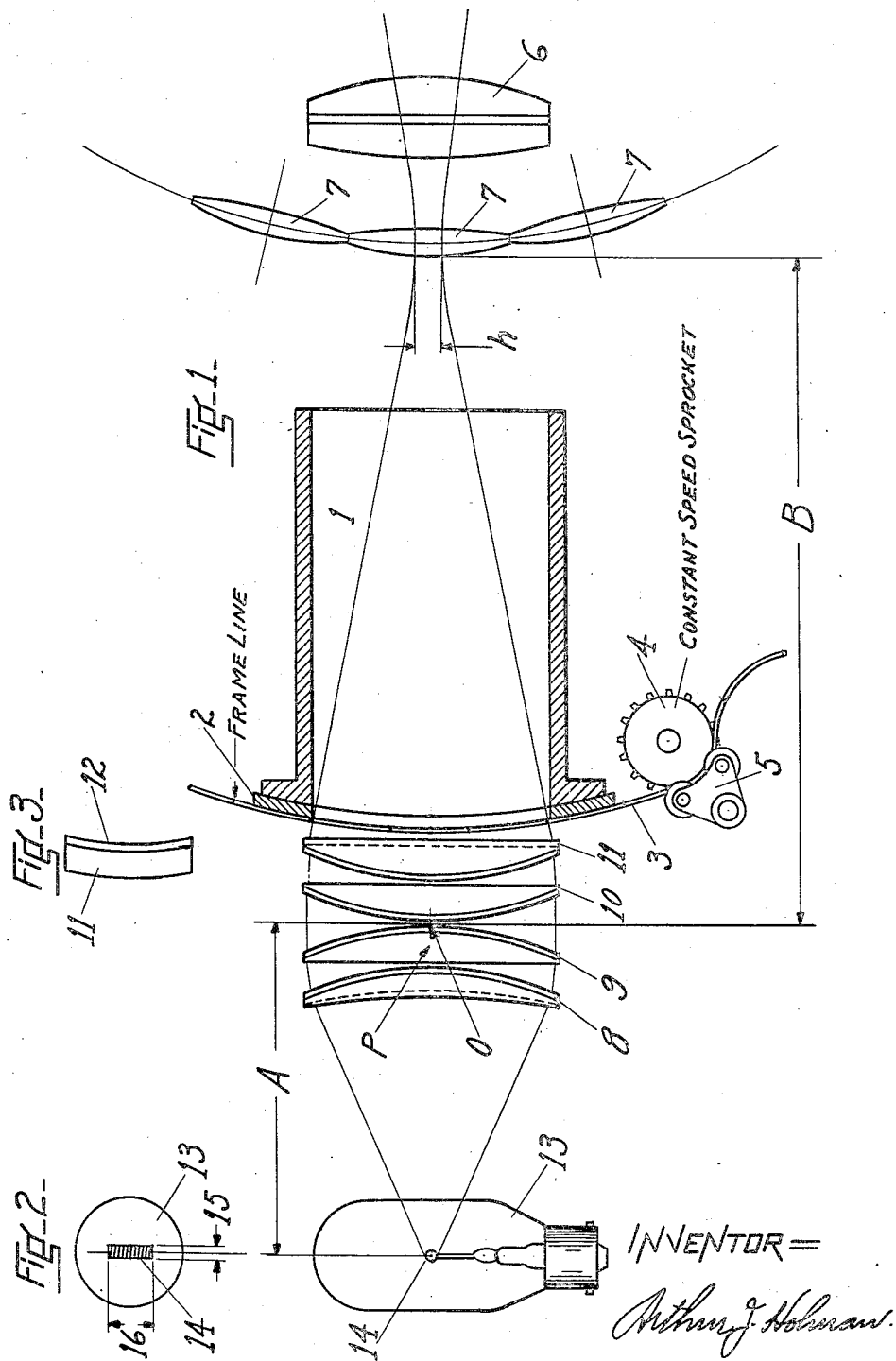

2,345,602

UNITED STATES PATENT OFFICE 2,345,602

APPARATUS FOR TELEVISION PICKUP FROM FILM

Arthur J. Holman, East Orange, N. J.

Application October 31, 1939, Serial No. 302,075

12 Claims. (Cl. 88—16.8)

My invention relates to apparatus for projecting a continuous screen image substantially free from cyclic intensity variations when using an ordinary motion picture film moving continuously over the aperture plate of the apparatus. The primary purpose of this invention is to secure the maximum resolving power of the optical rectifying system described in Letters Patent of the United States No. 1,957,457, dated May 8, 1934, and it is effected by combining with a rectangular light source of suitable proportions a close coupled condenser system comprising at least one highly astigmatic refracting surface. An incidental and valuable result, for certain purposes, is the shortening of the transition period between film frames which is obtained through the application of this invention to the revolving lens wheel optical rectifying system. In fact, this frame transition period during which images of two frames are superimposed in the screen plane, may be made long or short as may be found desirable, by simply modifying the design of either the condenser or the light source or both.

My device may be best understood by reference to the accompanying drawing in which Fig. 1 is a side elevation of my apparatus showing arrangement of the optical rectifying system, aperture unit, collector and condenser system and light source.

Fig. 2 is a view of the top end of the light bulb showing the rectangular proportions of the coil filament.

Fig. 3 is a top view of the condenser element having an astigmatic refracting surface.

Referring now more specifically to the drawing in which like reference numerals indicate like parts, 1 is an aperture unit shown partly in cross section supporting an aperture plate 2, over which the film strip 3 is propelled by the constant speed sprocket 4. The film strip 3 is retained in engagement with sprocket 4 by suitable idler roller mechanism 5, and is tensioned above the aperture unit by a suitable means (not shown).

The optical rectifying system comprises the fixed front component 6 mounted on the optical axis of the apparatus, and the multiple rear components 7 (three shown) which are fixedly mounted on the periphery of the lens wheel as more fully described in Letters Patent of the United States No. 1,957,457 hereinabove referred to.

The condenser system comprises the meniscus collector element 8, the plano-convex elements 9 and 10, and the sphero-cylindrical element 11, all of which are suitably aligned and supported as a unit on the optical axis in close proximity to the aperture plate 2. The sphero-cylindrical element 11 has a cylindrical refracting surface 12 facing the film strip 3 where it overlies aperture plate 2.

The incandescent lamp 13 is supported in such manner that its coil filament 14 is centered on the optical axis of the apparatus and in a horizontal position. The diameter 15 of the coil filament represents the height of the rectangular outline of the filament as viewed by the collector element 8, and the length 16 of the coil filament is the width of the rectangular outline as viewed by the collector element.

In Fig. 1, O represents the equivalent center or nodal point with respect to refraction in the vertical plane of the combined collector and condenser system and the lengths A and B are the distances respectively from nodal point O to the lamp filament and to the rear surface of the revolving lens wheel. In the actual apparatus, the length B is more or less fixed by the design of the condenser and the mechanical dimensions of the projection apparatus but the length A is made adjustable through means provided for focusing the image of the filament at the rear surface of the lens wheel where $h$ (Fig. 1) represents the height of said image.

It has been found that the cyclic variation in screen illumination, as the rectifying system operates, is least when the light source is focused at the lens wheel. It has also been found that the greatest resolving power is obtained from the rectifying system when the height $h$, of the light source image is a minimum. The function and purpose of the present invention is, therefore, to provide adequate illumination in the composite screen image in conjunction with a minimum height $h$, of the condenser beam at the lens wheel.

The particular optical arrangement illustrated in Fig. 1 has been used for television pick-up from film and, for this particular application of my device, a 10 volt 7.5 ampere concentrated filament lamp, such as is used regularly as an exciter lamp for sound-on-film pick-up, has provided ample illumination on the mosaic of an iconoscope. The filament 14 of this lamp has a diameter 15 which is ¼ to ⅓ of its length 16, hence the height of the filament image at the lens wheel, with any proper condenser system, will be small compared to its width.

Any condenser system, to function properly with my revolving lens wheel optical rectifier, must illuminate uniformly a section of film strip overlying the aperture to a height of approximately three film frames. This is necessary because the rectifying system picks up image rays from each incoming film frame advancing downwardly over the aperture plate before the frame has arrived at the position where its lower edge touches the optical axis and continues to pass image rays from the frame to the screen till the frame has passed to a position on the aperture plate entirely below the optical axis. Since the aperture in aperture plate 2 is more than twice as high as it is wide, there is no point in making the elements 8, 9, 10 and 11 of the condenser circular in contour, hence these elements are made rectangular in contour as indicated in Figs. 1 and 3, wherein the height of condenser element 11 is shown much greater than its width. Four elements are used preferably in the combined collector and condenser to minimize spherical aberration of elements which are necessarily of short focal length in order to pick up light from filament 14 through a large vertical angle. Since the elements 8, 9, 10 and 11 are relatively narrow, there is no point to using a lamp of higher wattage having a longer coil filament because the additional radient energy could not be distributed uniformly over the film overlying the aperture and at the same time be brought to a focus at the lens wheel. On the other hand, a condenser comprised entirely of spherical surfaces would produce a filament image at the lens wheel exactly proportional, in both dimensions, to the filament and, if the dimensions A and B and the focus of the condenser are such as to produce an image height $h$ sufficiently small, the width of the image would not fill the full lateral aperture of the objective system. This condition would lead to an excessively bright beam which greatly increases lens surface reflections and results in loss of contrast and degradation of shadows in the projected film image.

Uniform aperture illumination combined with minimum height $h$ and full lens aperture width of the condenser beam at the lens wheel is obtained by using a concave cylindrical refracting surface on condenser element 11 on the face adjacent the film position on the aperture plate. The axis of this cylindrical surface is vertical, hence the refracting power of element 11 is not lessened in the plane of Fig. 1. The full power of each convex refracting surface of elements 8, 9, 10 and 11 is applied to collecting maximum light from filament 14 and converging the same to a minimum beam height $h$, at the lens wheel. On the other hand, the refracting power of the concave cylindrical refracting surface is subtractive in the horizontal plane with respect to the refracting power of the convex spherical surfaces. If the cylindrical surface 12 is of the same curvature as the convex surface of element 11, this element will have zero refracting power in the horizontal plane. If the equivalent center of the condenser is at O with respect to refraction in the vertical plane, the equivalent center with respect to refraction in the horizontal plane is not at O but at some point P nearer to filament 14 than O, its exact position being determined by the negative refracting power of cylindrical surface 12. It is to be noted that the nodal point P, with respect to refraction in the horizontal plane may be shifted in the other direction, i. e., farther from filament 14 than O, by introducing a concave cylindrical surface into the condenser or collector on elements 8 or 9 instead of on element 11, the greater displacement being obtained if the cylindrical surface is on element 8. The preferable amount and direction of displacement of P with respect to O is determined by several factors, chief among which are; convergence or divergence of the condenser beam between lens wheel elements 7 and front component 6, focus of condenser beam at lens wheel as regards top and bottom edges compared to ends of filament image, uniformity of light distribution on film image, uniformity of light distribution on film strip overlying the aperture, and vertical and horizontal angle of light collection from filament. Conditions may be modified further by using more than one astigmatic surface in the system. The effect of the introduction of the cylindrical surface into the condenser is to increase the magnification ratio in the horizontal plane as compared with the magnification ratio in the vertical plane, hence the filament image will have a height $h$ relatively less than its width compared to the dimensions of filament 14.

In my system as used in television pick up from film, element 8 is approximately 6½ inch focus, elements 9 and 10 are approximately 5 inch focus, and sphero-cylindrical element 11 is made of spectacle crown (index 1.52) the spherical radius is 130 m. m. and the cylindrical radius is 4½ inches. The dimension B is approximately 6½ inches and A is about ½ B. With this arrangement, the filament image height $h$, is approximately $\frac{3}{32}$ of an inch.

It will be apparent from an examination of Fig. 1 of the drawing, which is to scale, that a multiple lens close coupled condenser mounted as close as possible to the aperture in the projector aperture unit is most advantageous for several reasons: first, close coupling of the lens elements in the condenser brings nodal point O closest to the front surface 12 of the condenser system; second, the closer the condenser is to the film aperture the smaller the condenser elements required to cover fully the three frame aperture with a converging condenser beam; third, the nearer nodal point O is to the moving elements 7 of the rectifying system the shorter the distance B and hence the lower the ratio B to A for a given solid angle of light pick-up; fourth, the greater the solid angle of light pick-up the more efficient is the illumination of the aperture film frames from a given light source; and fifth, the lower the ratio B to A the less the magnification of the light source when imaged upon moving elements 7 and hence the less the height $h$ of the focused condenser beam. Thus, close coupling of condenser elements and close mounting of the condenser with respect to the film aperture is important in obtaining the minimum height $h$ of the condenser beam combined with maximum illumination of the projected image.

With the lamp burning at 10 volts, 7½ amperes, the film aperture is lighted uniformly and the illumination at the mosaic in the iconoscope is equivalent to 65 foot candles on a white screen having an area approximately 4 by 5 inches. This illumination is more than sufficient to provide a brightly lighted image on the mosaic through any motion picture film of normal density.

When the revolving lens wheel optical rectifying system is operated at such low illumination levels, the film on the aperture is not highly lighted hence practically all the light which is projected into the iconoscope is contained within the envelope surrounding the condenser beam, or, in other words, the objective system transmits substantially no picture intelligence except that contained within the condenser beam which has a height $h$ at the lens wheel. Superimposed images in the screen plane are obtainable only when two lens wheel elements 7, are effective simultaneously. It follows, therefore, that superimposed iconoscope images exist only during that portion of the projection cycle when two lens elements 7 are within the zone of height $h$. In my present revolving lens wheel projector, the lens wheel elements 7 are approximately 1.60 inches in height and, since normal film projection is at the rate of 24 frames per second, the double image transition period occupies $\frac{1}{24} \times \frac{5}{32} \times 1/1.60$ or $1/245$ second approximately. The revolving lens wheel projector provides excellent registration and very good definition without appreciable light variation at the screen during this dissolve transition which, with the present set up, occupies a period less than 10 per cent of the frame projection cycle.

This invention as applied to the revolving lens wheel projector, makes the ideal arrangement for television pick-up from film. The image projected into the iconoscope is continuous, i. e., free from time pattern and cyclic variations, just as free, in fact, as is the iconoscope image when a live set is being televised in a studio. This image from film may be scanned at any desired interval and at any desired rate or continuously, and the television pick-up tube need have no storage capacity whatsoever. This system of television pick-up from film does not limit the television process to any particular number of lines per frame, or to any scanning frequency, or to any particular arrangement of interlacing, therefore television from film by this system is as free from restriction as is studio pick-up from live subjects, hence any future improvements in television can be adopted without scrapping the revolving lens wheel pick-up system.

In actual operation the revolving lens wheel film pick-up has produced superior results on several television systems, the continuous iconoscope image from film showing, on the monitors and on receivers, a much greater tone range with richer blacks and brighter whites. The intermediate tone range is so smooth in gradation and so extensive that exceptional modeling is obtained and this imparts remarkable depth to the transmitted image. It has been found with this system of television pick-up that greatly increased signal strength may be employed without causing deterioration in the blacks, i. e., turning them gray or washed out looking. Due to the high resolving power of this projection system, the definition in the transmitted image is superior.

While I have described a close-coupled condenser system applicable for television purposes and comprising at least one astigmatic refracting surface, it is to be understood that similar effects as to objective resolving power and to shortening the transition period may be obtained with the revolving lens wheel projector using other condenser and collector systems, providing ample illumination for any desired purpose through a condenser beam constricted to the necessary degree at the lens wheel in the vertical dimension. Equivalent means for accomplishing these results may be worked out by those skilled in the art, for applications of the revolving lens wheel projector other than television.

Having thus fully described my invention, what I claim is:

1. In apparatus for television pick-up from motion picture film an illuminating system for an optical rectifying projector, said projector having a three frame film aperture, multiple moving optical rectifying elements and a stationary objective component, said illuminating system comprising a condenser including multiple axially aligned close coupled lens elements positioned as close as possible to said three frame film aperture, and a long narrow concentrated light source presenting to said condenser an oblong substantially uniform luminous area, said light source being oriented with respect to said three frame film aperture so the smaller dimension of said oblong luminous area lies in the direction of motion of said moving optical rectifying elements, the multiple lens elements of said condenser being of such size and shape as to cover fully said three frame film aperture and having refracting surfaces of such power as to image, said oblong uniform luminous area on said multiple moving optical rectifying elements, the image height $h$ being small compared to the height of a rectifying element for the purpose of increasing the resolving power of said optical rectifying projector.

2. In apparatus for television pick-up from motion picture film an illuminating system for an optical rectifying projector, said projector having a three frame film aperture, multiple moving optical rectifying elements and a stationary objective component, said illuminating system comprising a condenser including multiple axially aligned close coupled lens elements positioned as close as possible to said three frame film aperture, and a concentrated light source presenting to said condenser a substantially uniform luminous area, the multiple lens elements of said condenser being of such size and shape as to cover fully said three frame film aperture and having astigmatic and spherical refracting surfaces of such power and so oriented with respect to said film aperture as to image said uniform luminous area on said multiple moving optical rectifying elements, the image height $h$ being small compared to image width for the purpose of increasing the resolving power of said optical rectifying projector.

3. In apparatus for television pick-up from motion picture film an illuminating system for an optical rectifying projector, said projector having a three frame film aperture, multiple moving optical rectifying elements and a stationary objective component, said illuminating system comprising a condenser including multiple axially aligned close coupled lens elements positioned as close as possible to said three frame film aperture, and a long narrow concentrated light source presenting to said condenser an oblong substantially uniform luminous area, said light source being oriented with respect to said three frame film aperture so the smaller dimension of said oblong luminous area lies in the direction of motion of said moving optical rectifying elements, the multiple lens elements of said condenser being of such size and shape as to cover fully said three frame film aperture and having astigmatic and spherical refracting surfaces of such power and so oriented with respect to said film aperture as to image said oblong uniform luminous area on said multiple moving optical rectifying elements, the image height $h$ being compressed by the astigmatic element of said condenser for the purpose of increasing the resolving power of said optical rectifying projector.

4. In apparatus for television pick-up from motion picture film an illuminating system for an optical rectifying projector, said projector having a three frame film aperture, multiple moving optical rectifying elements and a stationary objective component, said illuminating system comprising a condenser including multiple axially aligned close coupled lens elements positioned as close as possible to said three frame film aperture, and a concentrated light source presenting to said condenser a substantially uniform luminous area, the multiple lens elements of said condenser being of such size and shape, as to cover fully said three frame film aperture and having spherical refracting surfaces and an astigmatic refracting surface positioned adjacent the film aperture, said refracting surfaces being of such power and so oriented with respect to said film aperture as to image said uniform luminous area on said multiple moving optical rectifying elements, the image height $h$ being small compared to image width for the purpose of increasing the resolving power of said optical rectifying projector.

5. In apparatus for television pick-up from motion picture film an optical rectifying projector including an objective system, a multi-frame film aperture, a condenser and a light source, said objective system comprising a stationary objective component and multiple moving optical rectifying elements operating between said stationary objective component and said multi-frame film aperture, said condenser comprising multiple axially aligned close coupled lens elements positioned as close as possible to said multi-frame film aperture, the multiple lens elements of said condenser being of such size and shape as to cover fully said multi-frame film aperture and having spherical refracting surfaces of such power as to image said light source on said multiple moving optical rectifying elements for the purpose of minimizing cyclic illumination intensity variation in the composite screen image projected from said multi-frame film aperture by said objective system.

6. In apparatus for television pick-up from motion picture film an optical rectifying projector including an objective system, a multi-frame film aperture, a condenser and a light source, said objective system comprising a stationary objective component and multiple moving optical rectifying elements operating between said stationary objective component and said multi-frame film aperture, said condenser comprising multiple axially aligned close coupled lens elements positioned as close as possible to said multi-frame film aperture, the multiple lens elements of said condenser being of such size and shape as to cover fully said multi-frame film aperture and having astigmatic and spherical refracting surfaces so oriented with respect to said film aperture and of such power as to image said light source on said multiple moving optical rectifying elements, the image height $h$ being less than the image width for the purpose of improving the definition of the composite screen image projected from said multi-frame film aperture by said objective system.

7. In apparatus for television pick-up from motion picture film an optical rectifying projector including an objective system, a multi-frame film aperture, a condenser and a light source, said objective system comprising a stationary objective component and multiple moving optical rectifying elements operating between said stationary objective component and said multi-frame film aperture, said condenser comprising multiple axially aligned close coupled lens elements positioned as close as possible to said multi-frame film aperture, the multiple lens elements of said condenser being of such size and shape as to cover fully said multi-frame film aperture, said light source being long and narrow and presenting to said condenser an oblong substantially uniform luminous area, said light source being oriented with respect to said multi-frame film aperture so the smaller dimension of said oblong luminous area lies in the direction of motion of said moving optical rectifying elements, the multiple lens elements of said condenser having astigmatic and spherical refracting surfaces so oriented with respect to said film aperture and of such powers as to image said oblong luminous area on said multiple moving optical rectifying elements, the image height $h$ being compressed by the astigmatic element of said condenser for the purpose of providing adequate illumination, maximum resolving power and minimum cyclic variation in illumination in the composite screen image projected from said multi-frame film aperture by said objective system.

8. Apparatus for television pick-up from motion picture film including a revolving lens wheel projector having an objective system, a three frame film aperture, an astigmatic condenser and a long narrow light source, said objective system comprising a stationary component and multiple optical rectifying lens elements fixed on the periphery of a revolving lens wheel and operating between said stationary component and said three frame film aperture, said condenser comprising four axially aligned close coupled lens elements positioned as close as possible to said three frame film aperture, the multiple lens elements of said condenser being of such size and shape as to cover fully said three frame film aperture, said long narrow light source presenting to said condenser an oblong substantially uniform luminous area, the four lens elements of said condenser having astigmatic and spherical refracting surfaces of such powers as to image said oblong luminous area on said optical rectifying lens elements, said long narrow light source and the astigmatic element of said condenser being so oriented with respect to said three frame film aperture that the picture intelligence of three frames may be carried in a condenser beam of such height $h$ at the optical rectifying lens elements that the transition between film frames may occupy not over 10% of the film frame projection cycle: i. e., height $h$ shall not exceed 10% of the height of an optical rectifying lens element.

9. In apparatus for projecting from motion picture film a bright, evenly illuminated, well defined image free from time pattern, the combination of a revolving lens wheel projector and an illuminating system, said projector including a multi-frame film aperture, a stationary objective component and multiple optical rectifying lens elements fixed on the periphery of a lens wheel operating between said multi-frame film aperture and said stationary component, said illuminating system comprising a four element condenser positioned as close as possible to said multi-frame aperture and of such size and shape as to cover fully the area of said multi-frame film aperture, and a light source presenting to said condenser a luminous area, said condenser having such refracting power as to image said luminous area on said multiple optical rectifying lens elements as said lens wheel revolves.

10. Elements as in claim 8, the four element condenser including a meniscus collector element and an astigmatic element adjacent the multi-frame film aperture, said astigmatic element being oriented to reduce the height $h$ of the condenser beam envelope.

11. Elements as in claim 3, the light source being long and narrow to present to said condenser an oblong substantially uniform luminous area, said light source being so oriented with respect to said multi-frame film aperture that its image on a rectifying lens element will have its smaller dimension lying in the direction of movement of said rectifying lens element.

12. Elements as in claim 8, the four element condenser including a 6½" focus meniscus collector, two 5" focus elements and a sphero-cylindrical element of low refracting power in the horizontal plane, the light source being a 10 volt, 7.5 ampere single coil concentrated filament incandescent lamp such as is used currently in exciter systems for sound-on-film pick-up.

ARTHUR J. HOLMAN.